United States Patent [19]

Othen

[11] Patent Number: 4,594,369
[45] Date of Patent: Jun. 10, 1986

[54] PROCESS FOR PRODUCING CORROSION INHIBITING PARTICLES

[75] Inventor: David G. Othen, Bracknell, England

[73] Assignee: The British Petroleum Company p.l.c., London, England

[21] Appl. No.: 749,751

[22] Filed: Jun. 28, 1985

[30] Foreign Application Priority Data

Jul. 10, 1984 [GB] United Kingdom ............... 8417525

[51] Int. Cl.$^4$ .................... C08K 3/32; C08K 3/28; C08K 3/10
[52] U.S. Cl. .................. 523/200; 106/14.44; 252/387; 252/389 R
[58] Field of Search ............ 523/200; 252/387, 389.1, 252/389.3, 389.5, 389.54; 106/14.44

[56] References Cited

U.S. PATENT DOCUMENTS

| | | | |
|---|---|---|---|
| 3,232,887 | 2/1966 | Pessimisis | 252/435 |
| 3,874,883 | 4/1975 | Robitaille et al. | 106/14 |
| 3,899,624 | 8/1975 | Sutherland | 428/327 |
| 3,905,916 | 9/1975 | Riley et al. | 252/453 |
| 3,969,127 | 7/1976 | Robitaille et al. | 106/292 |
| 3,996,058 | 12/1976 | Wasp | 106/14 |
| 4,016,108 | 4/1977 | Robson | 252/455 |
| 4,210,575 | 7/1980 | Drake | 106/14 |
| 4,405,493 | 9/1983 | Pippard | 252/389 |
| 4,419,137 | 12/1983 | Cayless et al. | 106/14.44 |
| 4,459,155 | 7/1984 | Cayless | 106/14.21 |
| 4,474,607 | 10/1984 | Goldie et al. | 106/14.44 |

FOREIGN PATENT DOCUMENTS

720287 12/1954 United Kingdom .
1044350 9/1966 United Kingdom .
1503153 3/1978 United Kingdom .

*Primary Examiner*—Lewis T. Jacobs
*Attorney, Agent, or Firm*—Morgan, Finnegan, Pine, Foley & Lee

[57] ABSTRACT

A process for producing corrosion inhibiting particles comprising binding corrosion inhibiting anions to particles of an inorganic oxide by ion-exchange to form anion-exchanged particles, the anions of which are releasable by further ion-exchange in which the inorganic oxide particles having surface hydroxyl groups are first contacted with an acidic solution containing labile anions at a pH sufficiently below 7 for the protons of the hydroxyl groups to be replaced by the labile anions and thereafter contacting the particles of the labile anion-exchanged inorganic oxide with a solution containing the required corrosion inhibiting anions so that the labile anions are replaced by the corrosion inhibiting anions. The labile anions are anions of water soluble, acid compounds which have a lower affinity for the oxide surface than the required corrosion inhibiting anions and which form a soluble salt with the cation of the compound providing the corrosion inhibiting anions. The process facilitates the use of corrosion inhibiting anions which are sensitive to low pH in the preparation of corrosion inhibiting particles. In particular the process is useful for producing molybdate exchanged inorganic oxide particles.

11 Claims, No Drawings

PROCESS FOR PRODUCING CORROSION INHIBITING PARTICLES

The present invention relates to a process for producing corrosion inhibiting particles suitable for use in protective coatings, e.g. paints, to the corrosion inhibiting particles produced by the process and to coatings containing them.

British Patent GB No. 2071 070B discloses corrosion inhibitors comprising particles of an inorganic oxide having corrosion inhibiting anions chemically bound to the surface of the oxide particles.

The anions specifically disclosed in this patent are phosphate, chromate and benzoate anions. Such anions can be readily applied and chemically bound to inorganic oxides having surface hydroxyl groups by contacting the oxide with an acidic solution containing the anions, the uptake tending to increase as the pH of the solution decreases.

It is known that molybdate salts have corrosion inhibiting properties but corrosion inhibiting particles comprising molybdate anions chemically bound to inorganic oxides by ion-exchange are difficult to produce by the simple exchange technique of GB No. 2071 070B, because it is difficult to prepare solutions of molybdate anions of sufficient concentration and a suitably low pH.

British Patent Application GB No. 2091 325A discloses one method of overcoming this difficulty which method can be used to produce corrosion inhibiting particles containing molybdate anions or other corrosion-inhibiting anions similar to molybdate in that solutions of a sufficiently low pH are difficult to prepare, such as, for example, nitrobenzoate, or di- or tri-nitrobenzoate. This method comprises contacting the inorganic oxide with an aqueous solution containing the corrosion inhibiting anions at a temperature of from 50° to 95° C. and at a pH sufficiently low to initiate ion-exchange (e.g. less than or equal to 2.5) and maintaining the pH at this low level by the addition to the solution of further anions or a compound forming such anions in solution.

Although the method disclosed in GB No. 2091 235A is capable of producing effective corrosion inhibiting particles, the applicants have now invented a process for producing corrosion inhibiting particles which overcomes the problems associated with using the simple exchange technique of GB No. 2071 070B without the need for elevated temperatures which are required by the method of GB No. 2091 235A and which also facilitates the use of corrosion inhibiting anions which are sensitive to low pH. The process according to the present invention is particularly useful for producing molybdate exchanged inorganic oxide particles which may have surprisingly better corrosion inhibiting properties than particles produced by the method of GB No. 2091 235A.

According to the present invention a process for producing corrosion inhibiting particles comprising binding corrosion inhibiting anions to particles of an inorganic oxide by ion-exchange to form anion-exchanged particles, the anions of which are releasable by further ion-exchange is characterised in that inorganic oxide particles having surface hydroxyl groups are contacted with an acidic solution containing labile anions at a pH sufficiently below 7 for the protons of the hydroxyl groups to be replaced by the labile anions and thereafter contacting the particles of the labile anion exchanged inorganic oxide with a solution containing the required corrosion inhibiting anions so that the labile anions are replaced by the corrosion inhibiting anions.

The labile anions are anions of water-soluble, acidic compounds which have a lower affinity for the oxide surface than the required corrosion inhibiting anions and which form a soluble salt with the cation of the compound providing the corrosion inhibiting anions. Preferably the anions are singly charged ions. Suitable anions include chloride, bromide, iodide, perchlorate, formate, acetate and nitrate anions.

The process is particularly suitable for producing corrosion inhibiting particles containing molybdate anions and other corrosion-inhibiting anions similar to molybdate in that solutions of a sufficiently low pH are difficult to prepare, such as, for example, nitrobenzoate, or di- or tri-nitrobenzoate. The invention is also useful for producing corrosion inhibiting particles containing anions which are sensitive to very low pH either because they (a) decompose, e.g. nitrite, (b) polymerise e.g. molybdate, tungstate and vanadate or (c) de-polymerise e.g. tripolyphosphate. The process may also be used to produce corrosion inhibiting particles containing other corrosion inhibiting anions such as, for example, phosphate, chromate and benzoate anions as described in GB No. 2071 070B. The technique may provide better control over the ion-exchange reactions.

The inorganic oxide having surface hydroxyl groups is preferably alumina. Other oxides which may be suitable include silica, zirconia, iron oxides ($Fe_2O_3$ and $Fe_3O_4$) and tin oxides. Mixed metal oxides may also be useful as may naturally occurring clays such as kaolinite. The uptake of anions will depend on the proportion of replaceable hydroxyl groups and so inorganic oxides with a high proportion of such groups are preferred. Examples of suitable aluminas are the commercially available activated aluminas sold under the trade name "Camag" by BDH and defined as having a Brockman Activity of 1 for chromatography and those sold under the trade name Alcoa F1 by the Aluminium Company of America.

The BET surface area of the inorganic oxide before ion-exchange is preferably greater than 100 $m^2/g$. The BET surface area of alumina before ion-exchange is preferably in the range 200 to 350 $m^2/g$. The BET surface area of silica before ion-exchange may be greater than 500 $m^2/g$. As indicated subsequently the corrosion inhibiting particles should be of relatively small size if they are to be incorporated into a protective coating such as a paint. Thus particles having a small particle size may be ion-exchanged according to the process of the present invention. Alternatively, it has been found that relatively large particles can be ion-exchanged and then subsequently ground or milled to a smaller size without adverse effect. The use of larger particles does not significantly reduce the total uptake of anions. The subsequent size reduction is conveniently carried out by wet grinding before drying the particles but grinding dried particles is also suitable.

Chloride ions and nitrate ions are particularly suitable labile anions for use in the present invention. Any solution containing suitable labile anions at a suitable pH may be used e.g. solutions of the relevant acids or salts which dissolve to give acidic solutions. Hydrochloric acid is a particularly suitable acid solution for use in the present invention. The pH of the acid solution containing the labile anions must be sufficiently low for the hydroxyl groups on the surface of the inorganic oxide to be replaced by the labile anions but there is a lower limit determined by the pH level at which the inorganic oxide dissolves in the acid solution. Typically, the pH should not be allowed to fall below 1.0

The inorganic oxide particles having the labile anions bound to the particles by ion-exchange are then contacted with a solution containing the required corrosion inhibiting anions e.g. molybdate anions. Any solution containing the required corrosion inhibiting anions may be used. In the case of molybdate anions, the aqueous solution containing molybdate anions may be, for example, sodium molybdate. The solution containing the required corrosion inhibiting anions may be added to a slurry of the labile anion exchanged inorganic oxide particles. Preferably, however, the labile anion-exchanged inorganic oxide particles are added to the solution containing the required corrosion inhibiting anions. The ion-exchange reaction between the labile anions and the corrosion inhibiting anions may occur at a higher pH than the reaction to form the labile anion exchanged inorganic oxide particles. For example, chloride ions bound by ion-exchange to alumina particles may be replaced by molybdate anions at a pH in the range 7.5 to 8.0 and by nitrite anions at a pH in the range 5.0 to 5.5. At relatively high pH values the replacement of the labile anion by hydroxide ions rather than the required corrosion inhibiting anion may become significant. Therefore, the ion exchange reaction between the labile anions and the required corrosion inhibiting anions is preferably carried out at a pH of less than 11 and more preferably at a pH of less than 10.

The anion-exchanged inorganic oxide particles may then be washed, milled to a smaller particle size if required and then dried.

The ion-exchange reactions are equilibrium reactions which can conveniently be carried out at room temperature (e.g. approximately 20° C.). However, temperatures greater than or less than room temperature may be used. An increase in temperature reduces the time to reach equilibrium and a decrease in temperature increases the time to reach equilibrium. Inorganic oxide particles having a relatively small particle size may react more rapidly than larger particles and so it may, in certain circumstances, be desirable to use a temperature lower than room temperature in order to control the rate of the ion-exchange reaction. The concentration of the ions affects the position of the equilibrium. A high concentration of the anions to be exchanged forces the reaction further to completion.

The ion-exchange reaction between the labile anions and the surface hydroxyl groups of the inorganic oxide can be monitored by observing the pH of the solution. When the acid solution containing the labile anions is slowly added to a slurry of the inorganic oxide, the pH initially falls following the addition of the acid solution and then steadily rises as the ion-exchange reaction proceeds. The ion-exchange reaction is complete when the pH no longer rises after the addition of the acid solution. The pH of the solution may be measured using a suitable pH meter. The uptake of anions can be measured using known anaytical techniques.

The present invention includes corrosion inhibiting particles produced by the process as hereinbefore described.

The corrosion inhibiting particles prepared according to the process of the present invention may typically contain up to 0.5 millimoles/g of the corrosion inhibiting anion, depending inter alia, on the particular anion and the particular inorganic oxide used. The lower limit of the corrosion inhibiting anion is preferably 0.01 millimoles/g.

The corrosion inhibiting particles prepared by the process as hereinbefore described may be included in protective coatings and the present invention includes protective coatings containing the corrosion inhibiting particles. The protective coatings may be any of the known types of protective coatings based on film forming polymers or resins e.g. paints, varnishes and lacquers. It may, in particular, be primer paints based on epoxy resins, vinyl resins, alkyd resins, chlorinated rubbers or cyclised rubbers.

The corrosion inhibiting particles may act as a filler for the coating and may be included in amounts of up to 40% wt based on the composition to be applied and up to 80% wt based on the dry film weight. Corrosion inhibiting properties may be imparted to the protective coatings by relatively small amounts of the corrosion inhibiting particles, e.g. 10% wt, depending on the corrosion inhibiting anion content of the corrosion inhibiting particles.

A general purpose metal primer may typically contain approximately 10 to 20% w/w of anion-exchanged alumina corrosion inhibitor. Such a primer would have a corrosion inhibiting anion concentration in the dry film of approximately 0.06 millimoles/g.

When used in protective coatings the particles should be suitably small so as to remain in suspension in the composition before the application and so as not to substantially affect the ease of application or the smoothness of the dry coating. Suitably the particles are less than 40 microns in diameter, more preferably less than 10 microns.

The corrosion inhibiting particles act to release the corrosion inhibiting anions by ion-exchange with an ion which exists in the environment in which the particles are used. Unlike coatings containing sparingly water soluble salts which act by the solubilisation of the corrosion inhibiting salts, the corrosion inhibiting anions of the particles produced according to the present invention are preferentially released from the inorganic oxide in areas where the desired barrier properties of the coating are weakest.

The invention is illustrated by the following examples.

EXAMPLE 1

1000 g of an activated alumina, sold under the trade name Alcoa F1 by the Aluminium Company of America, were added to 2000 cm$^3$ of distilled water at room temperature (approximately 20° C.) and continuously stirred to maintain the solid particles in suspension. The particle size range of the alumina was 14 to 28 BSS mesh. The pH of the slurry as 9.75.

Concentrated hydrochloric acid was slowly added to the slurry and the pH monitored. The pH dropped and then a response typical of rapid ion-exchange was noted i.e. the initial drop in pH due to the addition of the HCl was followed by a steady rise in pH. The addition of the acid was continued, without allowing the pH to fall to less than 1.0, until the pH of the slurry stabilised at 1.25. A total of 225 cm$^3$ of hydrochloric acid were added to the slurry.

The slurry was allowed to settle and the supernatant liquid decanted off. The particles were twice re-slurried with 100 cm$^3$ of distilled water. The final slurry was filtered and the particles washed on the filter with a further 1000 cm$^3$ of water. The product was dried under a pressure of 0.5 atmospheres (approximately 50 kNm$^{-2}$) at 85° C. for 64 hours. X-ray fluorescence analysis of the granular chloride-exchanged alumina indicated a chloride content of 1.5% by weight.

EXAMPLE 2

94.8 g of Na$_2$ MoO$_4$ (Analar ex BDH) were dissolved in 400 cm$^3$ distilled water. The pH of the solution was 9.25. 200 g of the chloride-exchanged alumina produced in example 1 were added to the solution with stirring. The pH fell rapidly to 7.65 and then the rate of change of the pH decreased. The mixture was stirred for 55 minutes to equilibrate. The slurry, which had a final pH of 7.6, was washed repeatedly by allowing the particles to settle, removing the supernatant liquid by decantation and then reslurrying the particles with 300 cm$^3$ distilled water. The product was then ground with water in a ball-mill for 16 hours and the resulting slurry filtered. The filter cake was dried for 16 hours at a temperature of 100° C. under a pressure of 0.5 atmospheres (approximately 50 kNm$^{-2}$) and then de-aggregated by grinding with a pestle and mortar. X-ray fluorescence analysis of the molybdate-exchanged particles indicated that it contained 2.4% by weight of molybdenum.

EXAMPLE 3

69 g of Na NO$_2$ (Analar ex BDH) were dissolved in 1000 cm$^3$ of distilled water. The pH of the solution was 6.99. 200 g of the chlorine-exchanged alumina produced in Example 1 were added to the sodium nitrite solution with stirring. The pH fell slowly to 5.35. The mixture was stirred for 30 minutes to equilibrate. The product was washed repeatedly by allowing the particles to settle, removing the supernatant liquid by decantation and then re-slurrying the particles with 500 cm$^3$ of distilled water. The product was then ground with water for 6 hours in a ball-mill and the resulting slurry filtered. The filter cake was dried at 85° C. for 16 hours under a pressure of 0.5 atmospheres (approximately 50 kNm$^{-2}$). The dried filter cake was de-aggregated in a laboratory disc mill. Analysis of the nitrite-exchanged particles indicated a nitrite content of 1.2% by weight.

COMPARATIVE PREPARATION

A sample of molybdate-exchanged alumina was prepared according to the method disclosed in UK Published Patent Application No. 2091 235A, i.e. not according to the present invention.

1000 g of the same alumina as used in Example 1 were added to 1250 cm$^3$ of distilled water and the slurry heated to 95° C. with continuous stirring. The pH of the slurry was 9.4.

238 g of molybdenum trioxide (Analar ex BDH) were added over approximately one hour. The mixture was then stirred for a further 30 minutes. The final pH of the slurry was 2.6. The slurry was pressure filtered and the filter cake washed with 3000 cm$^3$ of hot distilled water to remove unreacted molybdenum trioxide. The product was then ground with water in a ball-mill for 16 hours and the resulting slurry filtered. The filter cake was dried at 95° C. for 16 hours under a pressure of 0.5 atmospheres (approximately 50 kNm$^{-2}$). The dried filter cake was de-aggregated by grinding with a pestle and mortar. X-ray fluorescence analysis of the molybdate exchanged alumina particles indicated a molybdenum content of 10.0% by weight.

EXAMPLE 4

Two anti-corrosive primer paints based on a long oil alkyd resin were prepared. Formulation A contained molybdate-exchanged alumina particles as prepared in Examples 1 and 2 and Formulation B contained the Comparative Preparation. The compositions of the paints are given in Table 1. The paints were prepared by gelling the resin with the thixotrope in a high speed disperser and then milling this with the other components in a ball-mill for 16 hours.

The paints were applied to degreased polished mild steel panels (ex Pyrene Chemical Services Limited) measuring approximately 152 mm×101 mm and cured for 7 days at room temperature (about 20° C.). Coated panels were then scratched through to the bare metal and subjected either to accelerated weathering in salt spray test ASTM B117-73 for 350 hours or to humidity test BS 3900 for 240 hours. The panels were then assessed for rusting according to ASTM 610-68. The rusting evaluation test ASTM 610-68 is a visual test of the specimens in which values are assigned on a scale of 0 to 10 where 10 is a good result (no rusting) and 0 is a bad result (100% of the surface rusted). The results of these tests are given in Table 2, together with the maximum cut-back which is the maximum spread of underfilm corrosion from the scratch.

TABLE 1

Paint Formulations

| Component | Formulations (grams) | |
|---|---|---|
| | A | B |
| Long-oil alkyd resin (Synolac 76W, ex Cray Valley Products Ltd) | 106.4 | |
| Soya Lecithin (ex BOCM Silcock) | 1.48 | |
| Thixomen (ex ICI) | 0.87 | |
| Titanium dioxide (RCR2, ex Tioxide UK Ltd) | 18.35 | |
| Microdol Extra (ex Norwegian Talc) | 18.20 | |
| Barytes (ex H. Haeffner & Company) | 45.69 | |
| Calcium Carbonate (Whiting, ex H. Haeffner & Company) | 11.55 | |
| White Spirit | 34.47 | |
| 24% Lead Naphthenate (Ault & Wiborg Paints Ltd) | 1.28 | |
| 10% Cobalt Octoate (Ault & Wiborg Paints Ltd) | 0.32 | |
| Methyl Ethyl Ketoxime (Ault & Wiborg Paints Ltd) | 0.29 | |
| Molybdate-exchanged alumina Example 1 and 2 | 53.78 | |
| Comparative Preparation | | 53.78 |

The results show that although the molybdate-exchanged alumina particles prepared according to Examples 1 and 2 contain less than one quarter of the amount of molybdenum contained in the particles prepared according to the Comparative Preparation, they have surprisingly better anti-corrosion properties. The maximum cut-back of the panels coated with Formulation A, the paint containing the molybdendum exchanged alumina produced according to the present invention, and subjected to ASTM B117-73 was reduced to almost half of the cut-back of the panels coated with Formulation B, the paint containing the corrosion inhibiting particles produced by the Comparative Preparation. The underfilm corrosion was reduced in both tests when the paint contained the corrosion inhibiting particles produced according to the present invention.

TABLE 2

| Formulation | Average Coating Thickness μm | ASTM B117-73 Salt Spray | | BS 3900 Humidity | |
| --- | --- | --- | --- | --- | --- |
| | | Underfilm Corrosion | Max Cut-Back mm | Underfilm Corrosion | Max Cut-Back mm |
| A | 68 | — | — | 9 | 3 |
| A | 60 | 9½ | 5½ | — | — |
| B | 54 | — | — | 3 | 2 |
| B | 61 | 7 | 10 | — | — |

I claim:

1. A process for producing corrosion inhibiting particles comprising binding corrosion inhibiting anions to particles of an inorganic oxide by ion-exchange to form anion-exchanged particles, the anions of which are releasible by further ion-exchange characterised in that inorganic oxide particles having surface hydroxyl groups are contacted with an acidic solution containing labile anions at a pH sufficiently below 7 for the protons of the hydroxyl groups to be replaced by the labile anions and thereafter contacting the particles of the labile anion-exchanged inorganic oxide with a solution containing the required corrosion inhibiting anions so that the labile anions are replaced by the corrosion inhibiting anions, the said labile anions being anions of water-soluble, acidic compounds which have a lower affinity for the oxide surface than the required corrosion inhibiting anions and which form a soluble salt with the cation of the compound providing the corrosion inhibiting anions.

2. A process as claimed in claim 1 in which the labile anions are singly charged anions.

3. A process as claimed in claim 2 in which the labile anions are selected from the group comprising chloride, bromide, iodide, perchlorate, formate, acetate and nitrate anions.

4. A process as claimed in claim 1 in which the corrosion inhibiting anions are selected form the group comprising molybdate, nitrobenzoate, di- or tri-nitrobenzoate, nitrite, tungstate, vanadate, phosphate, chromate and benzoate.

5. A process as claimed in claim 1 in which the inorganic oxide is alumina.

6. A process as claimed in claim 1 in which the ion-exchange reaction between the labile anions and the required corrosion inhibiting anions is carried out at a pH of less than 10.

7. A process according to claim 1 in which the acidic solution containing labile anions is a solution of hydrochloric acid.

8. A process according to claim 7 in which the solution containing the required corrosion inhibiting anions is a solution of sodium molybdate or sodium nitrite.

9. Corrosion inhibiting particles obtainable by the process as claimed in claim 7 or claim 8.

10. A protective coating containing corrosion inhibiting particles prepared by a process as claimed in claim 1.

11. A protective coating as claimed in claim 10 in which the coating is a paint based on an epoxy resin, a vinyl resin, an alkyd resin, a chlorinated rubber or cyclised rubber.

* * * * *